Patented Jan. 4, 1938

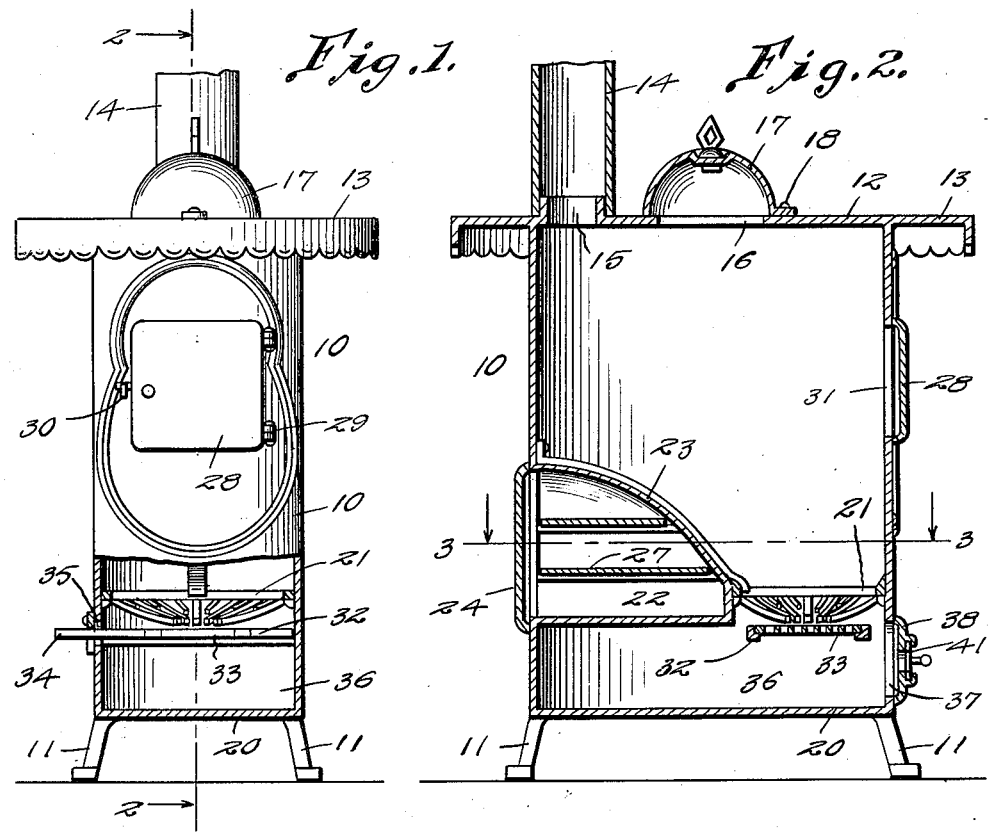
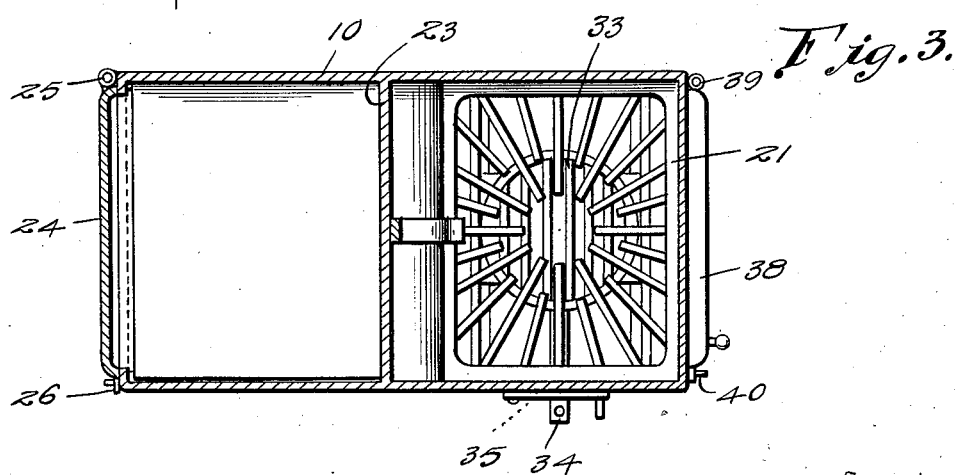

2,104,617

UNITED STATES PATENT OFFICE 2,104,617

HEATING COOK STOVE

Laura Gilbert, Chicago, Ill.

Application April 5, 1937, Serial No. 135,136

2 Claims. (Cl. 126—4)

This invention relates to a heating cooking stove.

It is primarily aimed to provide a stove generally of the appearance and character of a heating stove, in which provision is made for cooking without sacrifice of its heating function.

Another object is to provide such a stove in which an oven is provided behind the grate, accessible from the rear of the stove, and partitioned from the fire box of the stove by an upwardly and rearwardly extending wall.

The more specific objects and advantages will become apparent from a consideration of the description following taken in connection with accompanying drawing illustrating an operative embodiment.

In said drawing:—

Figure 1 is a view of the stove primarily in front elevation and partly in section;

Figure 2 is a vertical sectional view taken on the line 2—2 of Figure 1, and

Figure 3 is a horizontal sectional view taken on the line 3—3 of Figure 2.

Referring specifically to the drawing, a suitable casing is provided at 10 supported by legs 11, the casing having a top wall 12 terminating in an outwardly extending marginal rim 13. From said wall 12 a discharge flue 14 rises, being in communication with an outlet opening 15 in the wall. Such wall has an opening 16 therethrough over which a dome shaped closure 17 is pivoted at 18.

The casing has a bottom wall at 20 and above the same is a grate 21 to support the fire bed. Such grate however only extends part way of the depth of the stove, for instance about one-half of the depth as shown and in the rear of it the casing is formed into an oven 22 for cooking purposes. The front wall of the oven also functions in supporting the fire bed thence it extends upwardly and rearwardly as at 23, from the grate 21. Said oven 22 is open at the rear of the stove and closed by a conventional door 24 hinged to the casing at 25 and secured by any suitable latch means at 26 against accidental opening. Shelves 27 may be provided in the oven if desired to support the receptacles for materials being cooked.

A fuel door is provided in the front of the casing above the grate as at 28, being hinged thereto at 29 and fastened by latch means at 30 against accidental opening, the door covering an opening 31 in the casing.

In a frame 32 fastened to the casing beneath the grate 21, an auxiliary grate 33 is mounted to be shaken or rocked through the medium of a handle 34 extending therefrom and through an enlarged slot 35 in one side of the casing. The shaking of the element 33 facilitates the removal of ashes. Such ashes are received in an ash pit 36 open at the front at 37 and closed by a suitable door 38 pivoted thereto at 39 and latched against accidental displacement as at 40.

Said door preferably contains a controllable draft opening 41.

Various changes may be resorted to provided they fall within the spirit and scope of the invention.

I claim as my invention:—

1. A stove of the class described having a casing, an oven in the casing extending partly across the same, and a grate extending across the remainder of the casing, the wall of the oven being positioned to partly support the fuel bed, the top wall of the oven extending upwardly and away from the grate, the wall of the casing extending above the grate and said wall of the oven and enclosing a single space to contain fuel supported on the grate and on said wall of the oven, a fuel door for the casing, a door for the oven, said doors being located at different sides of the casing.

2. A stove of the class described having a casing, an oven in the casing extending partly across the same, and a grate extending across the remainder of the casing, the wall of the oven being positioned to partly support the fuel bed, the top wall of the oven extending upwardly and away from the grate, the wall of the casing extending above the grate and said wall of the oven and enclosing a single space to contain fuel supported on the grate and on said wall of the oven, a fuel door for the casing, a door for the oven, said doors being located at different sides of the casing, an ash pit beneath the grate and oven and a door leading to the ash pit.

LAURA GILBERT.